United States Patent [19]

Inazawa et al.

[11] Patent Number: 4,958,244
[45] Date of Patent: Sep. 18, 1990

[54] METHOD OF POSITION DETECTION ON A RECORDING MEDIUM

[75] Inventors: Yoshizumi Inazawa, Kanagawa, Japan; Brian Milthorp, Bristol, United Kingdom; Bruce Thompson, Ft. Collins, Colo.

[73] Assignee: Sony Corporation, Tokyo, Japan

[21] Appl. No.: 294,053

[22] Filed: Jan. 5, 1989

[30] Foreign Application Priority Data

Jan. 8, 1988 [GB] United Kingdom ............... 8800352

[51] Int. Cl.$^5$ ............................................. G11B 27/19
[52] U.S. Cl. ................................. 360/72.1; 360/72.2; 360/74.4; 369/32
[58] Field of Search .................. 360/72.1, 72.2, 74.4, 360/73.1, 69, 71; 369/32, 111

[56] References Cited

U.S. PATENT DOCUMENTS

| | | | |
|---|---|---|---|
| 4,716,558 | 12/1987 | Katayama et al. | 360/72.2 |
| 4,754,346 | 6/1988 | Takagi et al. | 360/74.4 |
| 4,764,823 | 8/1988 | Baumeister | 360/72.1 |
| 4,774,699 | 9/1988 | Giddings | 360/72.2 |
| 4,805,050 | 2/1984 | Aoyagi et al. | 369/32 |
| 4,816,936 | 3/1989 | Sakuragi | 360/72.1 |
| 4,837,640 | 6/1989 | Ozaki et al. | 360/72.2 |

Primary Examiner—A. J. Heinz
Assistant Examiner—Alfonso Garcia
Attorney, Agent, or Firm—Philip M. Shaw, Jr.

[57] ABSTRACT

A method of position detection on a recording medium is performed by moving the recording medium alternately in normal and reverse directions, while searching for a target position, and decreasing the travel speed of the recording medium with each change in direction. Immediately after a target position has been finally passed, a report signal of the search completion is generated, thereby shortening the search time.

10 Claims, 9 Drawing Sheets

|      | MSB                          LSB    |
|------|--------------------------------------|
| PC 1 | 0  0  1  0   |   T. B.O.             |
| PC 2 | SSMC(SAVE SET MARK COUNT)(MSB)       |
| PC 3 | SSMC(SAVE SET MARK COUNT)(LSB)       |
| PC 4 | RMC(RECORD MARK COUNT)(MSB)          |
| PC 5 | RMC(RECORD MARK COUNT)               |
| PC 6 | RMC(RECORD MARK COUNT)               |
| PC 7 | RMC(RECORD MARK COUNT)(LSB)          |
| PC 8 | PARITY                               |

METHOD OF POSITION DETECTION ON A RECORDING MEDIUM

BACKGROUND OF THE INVENTION

1. Field of the Invention

The present invention relates to an apparatus and method for recording and/or reproducing a digital signal, and more particularly to such an apparatus and method suitable for use in recording and/or reproducing a digital signal transferred from a computer or the like.

2. Description of the Prior Art

In practice, data stored in a hard disk or the like of a computer can be transferred to and recorded by a data streamer (data-recorder) once a day so as to protect the data or back up the same.

For this operation, or as a data recorder, analog audio tape recorders have been conventionally used in many cases. However, analog tape recorders have disadvantages in that they need an excessive amount of a recording medium or magnetic tape for recording and operate at a quite low data transferring rate upon recording, so that it takes too much time to transfer and record such data information. Moreover, analog tape recorders have problems, e.g. the starting point of a desired portion of the recorded data information cannot be rapidly searched for, and so on.

Thus, to overcome the above-mentioned problems, it is thought to utilize a helical-scan type DAT (digital audio tape recorder) using a rotary head, that is, a so-called recently commercialized DAT as a data recorder. Such data recorders utilizing a DAT are described in U.S. Pat. Nos. 4,873,589, 4,899,232, and 4,876,616 and in co-pending U.S. patent application Ser. No. 210,229 filed June 23, 1988. by one of the assignees of the present application.

To utilize the DAT as a data recorder, data transferred from a host computer is transformed in accordance with a DAT format before recording. In the DAT format, one frame is made up of two oblique tracks formed by one rotation of two heads having different azimuth angles. 16-bit PCM audio data, which has been interleaved, and auxiliary sub-data are recorded in this one frame area as a unit. During recording, there are formed in each track a main area for recording the PCM data and a sub-area for recording the sub-data.

The DAT has a high-speed search function. The high-speed search operation in the conventional DAT is performed by the method shown in FIG. 1.

Figure 1:
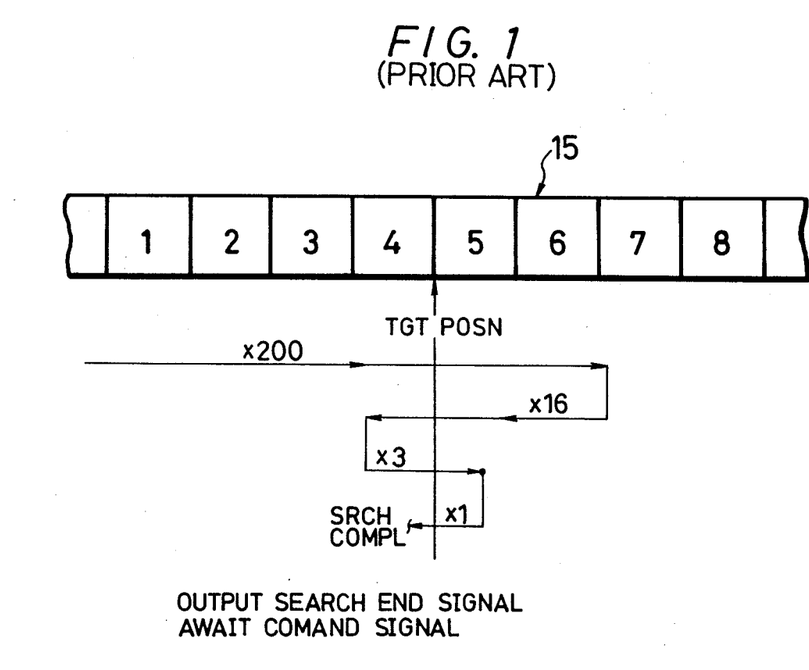
FIG. 1 is a view showing a conventional search method.

In FIG. 1, when a target position of a magnetic tape 15 on which position signals "1", "2", "3", . . . are recorded is designated as, e.g., "4" in performing a search operation, a position detection signal is detected while driving the tape 15 at a 200-times normal playback speed. When the target position "4" is detected, a stop signal is supplied, and the tape 15 passes by the target position and is then stopped. The tape 15 then travels in the reverse direction at 16 times normal speed, and when the target position is detected, a stop signal is supplied. In this case, the tape 15 passes by the target position and is again stopped. The tape 15 is again reversed and travels at 3 times the normal speed. When the target position is detected, the stop signal is supplied. The tape 15 is again reversed and travels in the reverse direction at the normal speed. When the target position is detected and the stop signal is supplied, the tape 15 slightly passes by the target position, and is then stopped. In this case, a search end signal is output, and the next command signal is awaited. When the command signal is input in this waiting state, the magnetic tape 15 travels in the opposite direction at the normal speed, and the target position "4" is accurately detected.

The conventional high-speed search operation is performed as described above. Since the tape is kept stopped after the search end signal is output until the next command signal is input, there is a time loss, thus impairing the efficiency of the search operation.

SUMMARY OF THE INVENTION

It is a primary object of the present invention to provide a search method for a recording medium, capable of performing a search operation without wasting time.

The above and other objectives are achieved by a search method for a recording medium in which said recording medium recorded with a position signal is alternately driven in normal and reverse directions while detecting the position signal and decreasing the travel speed each time the travel direction is switched so as to detect a target position on said recording medium, wherein after it is detected that the target position has been last passed, a report signal indicating that the target position has been searched is generated.

In carrying out this data search method, a target count value and a count value reproduced from said recording medium are compared with each other, the direction and speed of the recording medium are controlled in accordance with the comparison output, and when the count value reproduced from the recording medium becomes close to the target count value, the report signal is generated after detecting a division of the unit count signal.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 2:
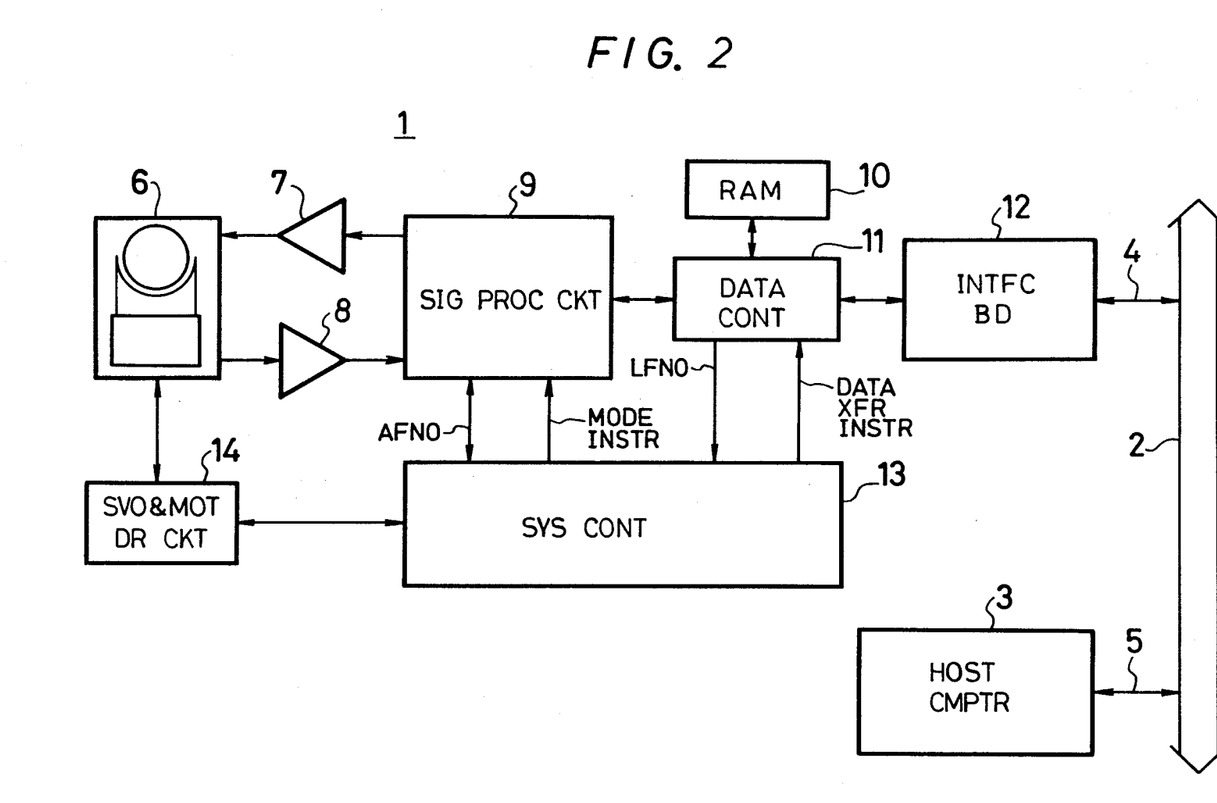
FIG. 2 is a block diagram showing an embodiment of the present invention.

FIG. 2 shows an arrangement when a DAT is used as a data recorder. Reference numeral 1 denotes a DAT; 2, an interface bus; 3, a host computer; and 4 and 5, inner buses. The DAT 1 is mainly constituted by a recording-/reproducing section 6, a recording amplifier 7, a reproducing amplifier 8, a signal processing circuit 9, a RAM 10, a data controller 11, an interface board 12, a system controller 13, a servo and motor drive circuit 14 and the like.

The system controller 13, the signal processing circuit 9 and the data controller 11 are arranged to exchange predetermined signals such as an absolute frame number AFNO, a mode instruction, a logical frame number LFNO, a data transfer instruction and the like.

Although not shown, the recording/reproducing section 6 is provided with a rotary head drum. A magnetic tape is wound around the drum in an angular range of about 90° and is fed by a capstan. The drum has two heads A and B having different azimuth angles. During one revolution of the drum, two oblique tracks are recorded or reproduced on or from the tape.

Digital data supplied from the host computer 3 through the buses 5, 2 and 4 are input to the interface board 12, and are then subjected to predetermined signal processing in the data controller 11, the RAM 10, the signal processing circuit 9 and the like in accordance with instructions from the system controller 13. In this manner, conversion to the DAT format described above is performed. The converted signal is supplied to the recording or reproducing section 6 through the recording amplifier 7, and is recorded on the magnetic tape by the heads A and B.

The signal recorded on the magnetic tape can also be reproduced by the heads A and B. The reproduced signal is supplied to the signal processing circuit 9 through the reproducing amplifier 8. Digital data which is obtained by reconverting the reproduced signal by the signal processing circuit 9 is supplied to the host computer 3 through the data controller 11, the interface board 12 and the buses 4, 2 and 5.

Figure 3:
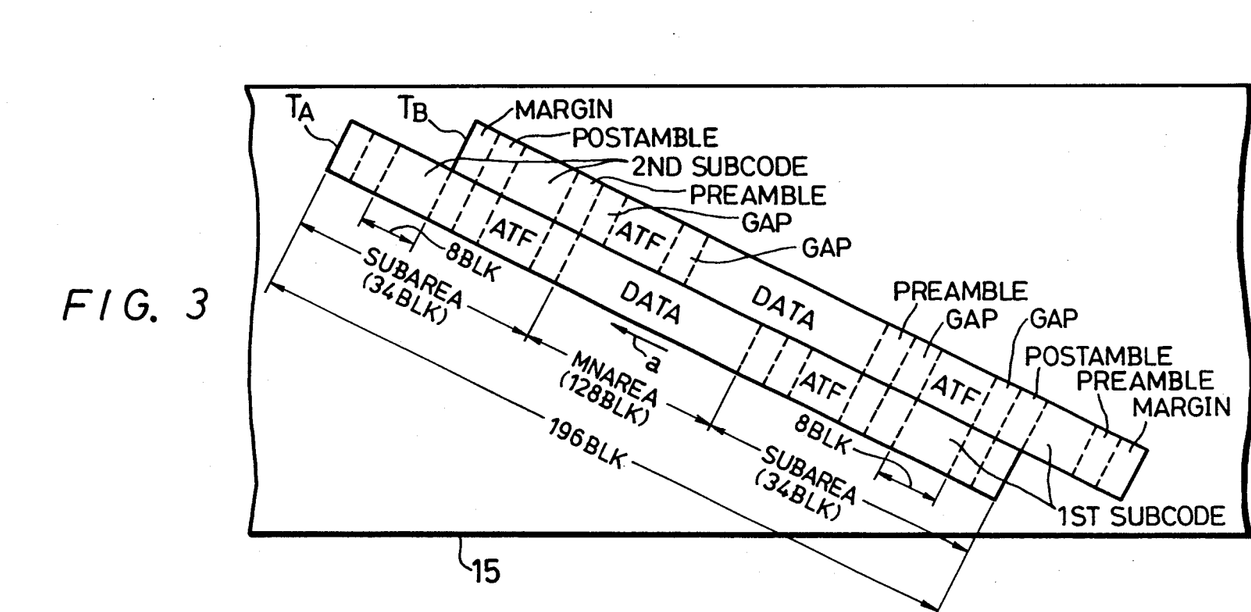
FIG. 3 is a view showing a DAT format.

In the above apparatus, the DAT format on the magnetic tape is as shown in FIG. 3.

In FIG. 3, during one revolution of the heads A and B, two oblique tracks $T_A$ and $T_B$ are formed on a tape 15 from its lower side, as indicated by an arrow a. The two tracks $T_A$ and $T_B$ constitute one frame. The track $T_A$ (or $T_B$) consists of 196 blocks, and one block consists of 288 bits. 34 blocks at each end portion serve as a sub area, and 128 central blocks serve as a main area.

Each sub area is further divided into sections. More specifically, there are provided, from the lower end of the track, a margin section, a PLL preamble section of a sub code, a first sub-code section constituted of 8 blocks, a postamble section, a gap section for a block section, a tracking (ATF) signal section, a gap section between adjacent blocks, and a PLL preamble of data. Then, after the main data section there follows a gap section between adjacent blocks, an ATF signal section, a gap section between adjacent blocks, a PLL preamble section of a sub code, a second sub-code section constituted by 8 blocks, a postamble second sub-code section, and a margin section. The other blocks are constituted by predetermined numbers of blocks, respectively. Note that in FIG. 3, the measure of lengths of sections is not accurately depicted.

Figure 4:
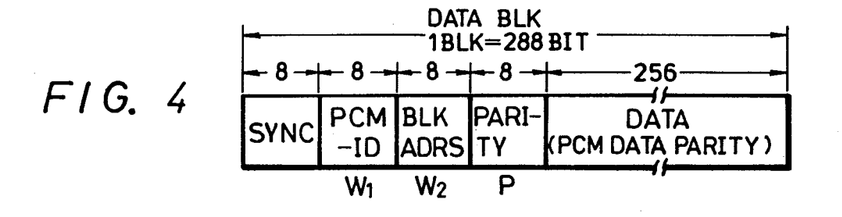
FIG. 4 is a view showing a data format of a main data block.

The main area consists of 128 data blocks. As shown in FIG. 4, each block is constituted by an 8-bit sync signal, an 8-bit PCM-ID ($W_1$), an 8-bit block address ($W_2$) and an 8-bit parity, and main data is stored in the following 256-bit section. The main data is 16-bit PCM data for L and R channels when an audio signal is processed. The 16-bit main data are interleaved in the main areas of the tracks $T_A$ and $T_B$ (one frame) together with the parity. In this case, in the main areas in one frame, about 5760-bytes of data is recorded. When the DAT is used as a data recorder, the data sent from the host computer 3 are converted into 16-bit data and are processed in the same manner as the PCM data. These data are formatted as shown in FIG. 5, and are recorded in the main area of each frame.

Figure 5:
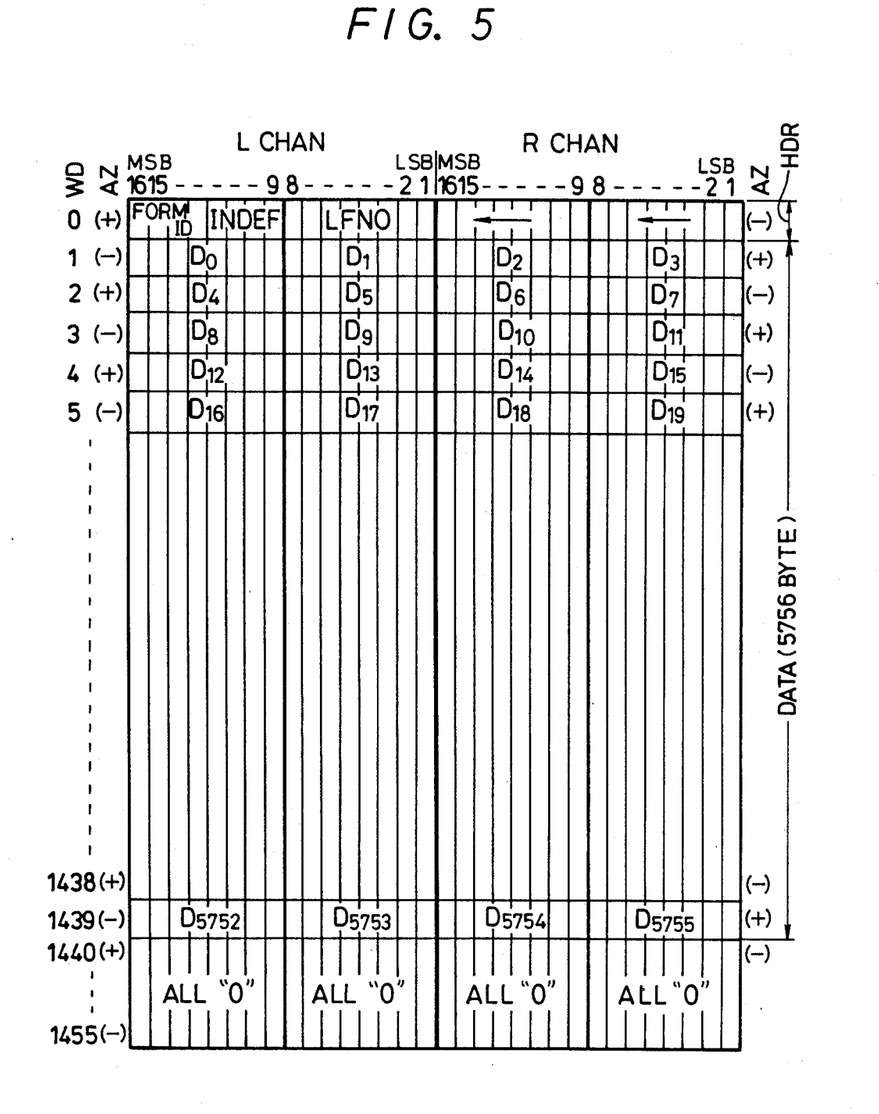
FIG. 5 is a view showing a data format of a main area for one frame.

More specifically, in FIG. 5, the above 5760 bytes are divided into words (0 to 1439), each consisting of 4 bytes (32 bits). These words are divided into 16-bit (2-byte) L and R channels to comply with the audio signal format. In this format, a header portion is provided in the first 1 word (4 bytes). 4 bits near the most significant bit (MSB) of the first half byte in the L channel in this header portion serve as a format ID indicating the format of the data recorder, and the remaining 4 bits of this byte are indefinite. The remaining one byte in this L channel are used as logical frame number (LFNO) areas. Each 8-bit area LFNO provides a binary value indicating one of the series of numbers 1 to 23 to designate each frame in units of 23 frames. In the R channel in the header portion, the same data as that in the L channel are provided.

A total of 5756 bytes of a data portion is provided in the following words "1"to "1439", and data signals from the host computer 3 are sequentially stored in respective words in units of 4 bytes.

The logical frame number LFNO will be described below. Each LFNO area indicates one of the serial numbers 1 to 23 of the frames in units of 23 frames. That is, the frame numbers 1 to 23 repeatedly appear every 23 frames.

By designating a unit numbered by such LFNOs, the divisions for each predetermined amount of data can be easily detected, and signal processing and high-speed searching can be facilitated.

The data formats in the first and second sub-code sections in the sub area will be described. Each of the first and second sub-code sections consists of 8 sub-code blocks, and can record 2048-bits of data.

Figure 6A:
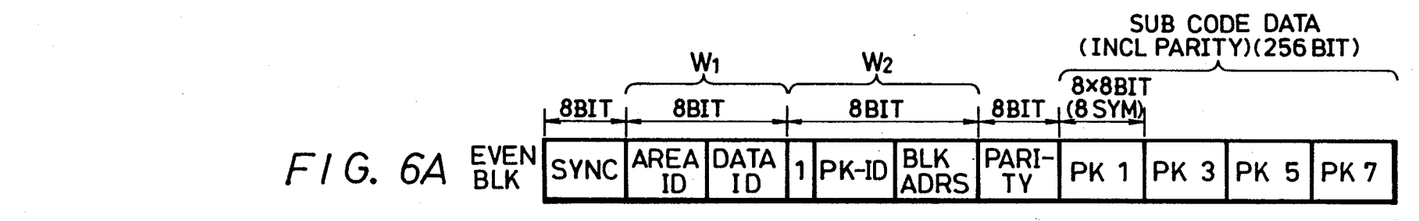
FIGS. 6A and 6B are depictions of the data formats of the EVEN and ODD sub code blocks, respectively.
Figure 6B:
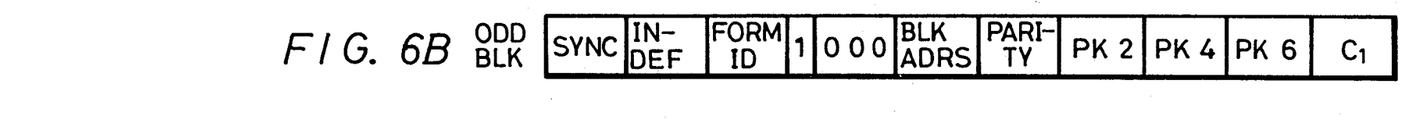

FIGS. 6A and 6B show, respectively, the constructions of the even-numbered sub-code block (EVEN block) and the odd-numbered sub-code block (ODD block), in each of which a synchronizing signal, the areas $W_1$ and $W_2$ and a parity, respectively formed of eight bits, and 256 bits of sub-code data including a parity are located in this order. The sub-code data is divided into four packs formed of 64 ($8 \times 8$) bits (eight symbols), respectively.

As shown in FIGS. 6A and 6B, the contents of $W_1$ and $W_2$ in the EVEN block are different from those in the ODD block, and the packs in the EVEN and ODD blocks are alternately numbered from "1" to "7". The eighth pack is assigned to record an error detecting code $C_1$.

$W_1$ of the EVEN block consists of a 4-bit area ID and a 4-bit data ID, and $W_2$ thereof consists of an upper bit "1", a 3-bit pack ID, and a 4-bit block address. $W_1$ in the ODD block consists of a 4-bit indefinite portion, and a 4-bit format ID, and $W_2$ thereof consists of an upper bit "1", a 3-bit all "0" code, and a 4-bit block address.

Each of the packs "1" to "7" is divided into 8 words in units of 8 bits. Each word includes, together with a parity, various codes such as a code indicating a read-in area of a recording start portion on a tape, a code indicating a read-out area of a recording end portion, a code indicating a recording date, an absolute frame number, a logical frame number and the like.

Figure 7:
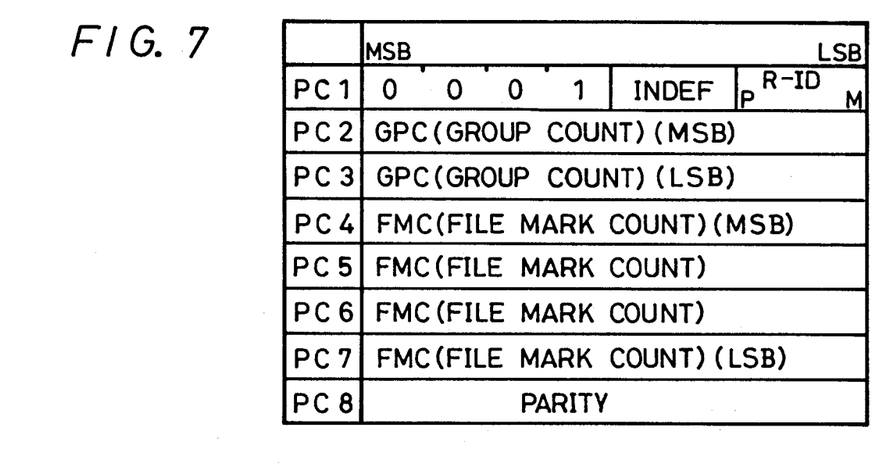
FIGS. 7 and 8 are views showing data formats of packs in the sub-code block.
Figure 8:
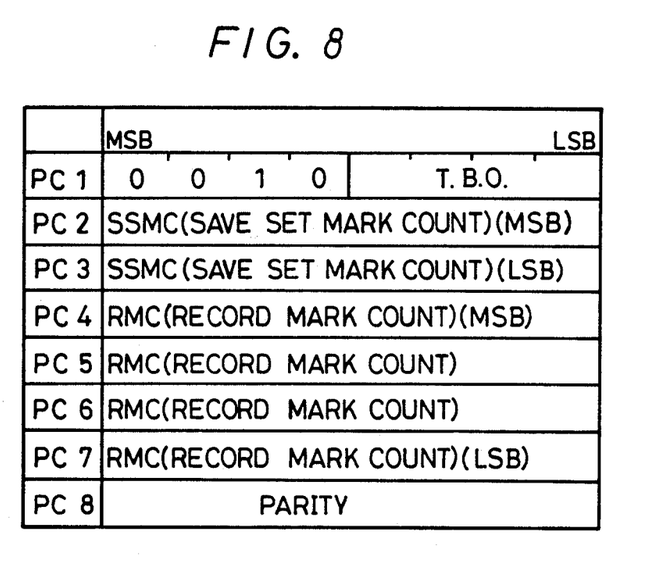

FIG. 7 shows the format of the pack "1" of the seven packs, and FIG. 8 shows a format of the pack "2".

In FIG. 7, the pack "1" consists of eight 8-bit words PC1 to PC8. The upper four bits of the word PC1 are assigned to a pack number (in this case, "0001" indicating pack "1"), and the next 2 bits are indefinite. The following lower two bits (P,M) provide a repeat ID (R-ID) associated with multiple writing of data for a plurality of units. The following words PC2 and PC3 (16 bits) are assigned to a group count GPC. The group count GPC is a value obtained by counting the number of units of 23 frames (called groups hereinafter) from the leading end of a tape.

The following words PC4 to PC7 (32 bits) are assigned to a file mark count FMC. A file mark indicates a division of a predetermined amount of data sent from the host computer. The file mark count FMC is a value obtained by counting the number of file marks from the leading end of the tape until counting of the count GPC is completed for group of 23 frames. The word PC 8 is assigned to a parity for the words PC1 to PC7.

In FIG. 8, the pack "2" consists of 8 words PC1 to PC8. The upper 4 bits of the word PC1 are assigned to a pack number (in this case, "0010" indicating the pack "2"). The words PC2 and PC3 (16 bits) are assigned to a save set mark count SSMC. Data recorded by the data recorder during one back-up operation is called a save set, and a save set mark is sent from the host computer for each save set. The save set mark count SSMC indicates a value obtained by counting the number of save set marks from the leading end of the tape until counting of the count GPC is completed for each group of 23 frames. The following words PC4 to PC7 (32 bits) are assigned to a record mark count RMC. A record mark is a mark sent from the host computer for each division of a predetermined amount of data. The record mark count RMC indicates a value obtained by counting the number of record marks from the leading end of the tape until counting of the count GPC is completed for each group of 23 frames. The word PC8 is assigned to a parity for the words PC1 to PC7.

In this embodiment, as described above, the packs "1" and "2" provide four count values GPC, FMC, SSMC, and RMC respectively indicating divisions of data. In other words, these count values represent four types of units. These units are not especially associated with data lengths (recording lengths on a tape), and have predetermined independent lengths. The counts FMC, SSMC, and RMC are represented in association with the count GPC.

Figure 9:
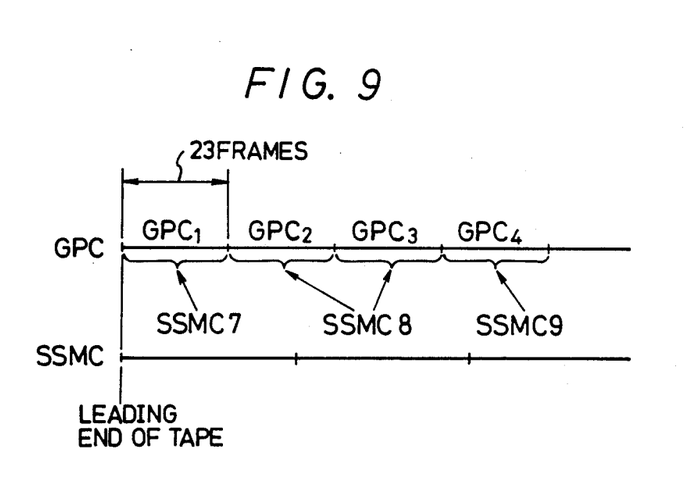
FIG. 9 is a view showing the relationship between groups and save sets.
Figure 10A:
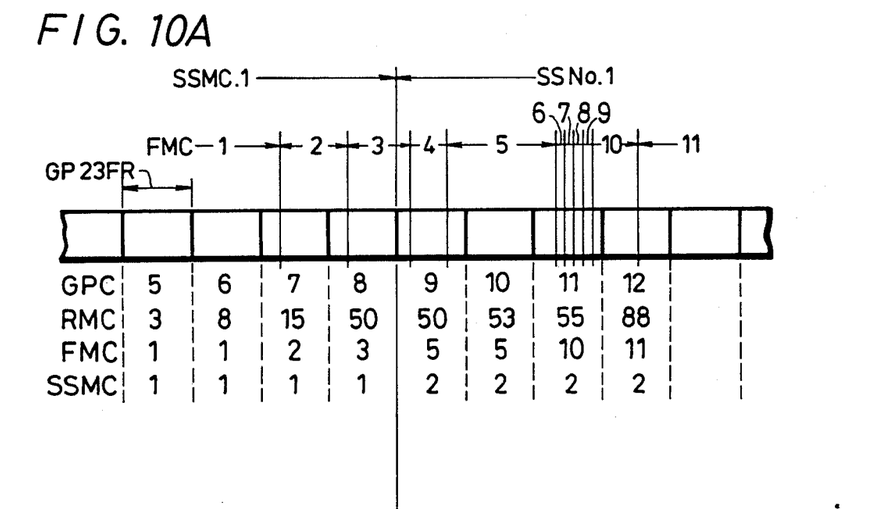
FIG. 10A shows an example of the indications of the counts GPC, FMC, SSMC, and RMC for various groups of 23 frames.

FIG. 9 shows the relationship between the counts GPC and SSMC. The number of save set marks from the leading end of the tape until each time when a group of 23 frames is completed is recorded as the count SSMC in each of the 23 frames constituting the group including the timing. In the case of FIG. 9, when the counting of the group GPC 1 is completed, since seven save set marks are counted, SSMC 7 is recorded in each of the 23 frames of the group of GPC 1. The same set of SSMC 8 extends over two groups of GPC 2 and GPC 3. Therefore, counts SSMC 8 are recorded in each of the 46 frames of these groups. The relationships between the other counts FMC and RMC and the count GPC are also determined in the same manner as in FIG. 9. FIG. 10A shows examples of the indications of the counts GPC, FMC, SSMC, and RMC for the respective groups.

Therefore, the above-mentioned counts GPC, FMC, SSMC, and RMC can be selectively detected, so that a high-speed search operation can be performed.

A detailed description of the method of the high-speed search operation carried out by the system controller 13 according to the present invention will be described with reference to FIGS. 10B, 10C, 11A and 11B. The target position is given as FMC=4, and in order to detect the target position, the count GPC is used to first detect a boundary point between GPC8 and GPC9.

Figure 10B:
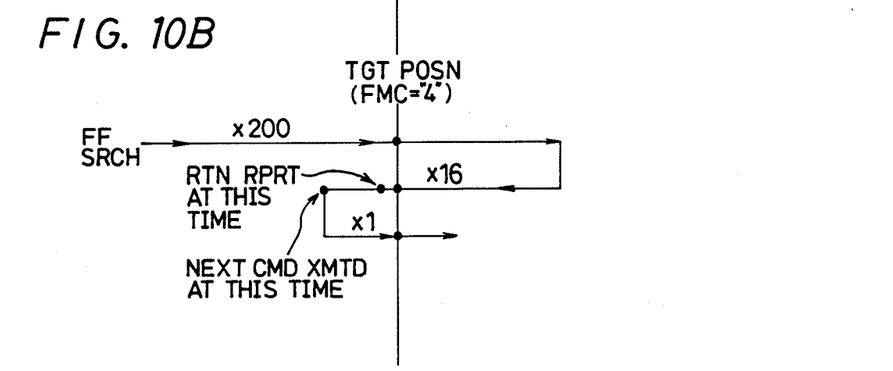
FIGS. 10B is an illustration showing a forward tape direction search method.

The high-speed search operation includes a fast forward (FF) search mode in which the search operation is performed while fast-forwarding the tape at 200 times normal playback speed in a FWD direction (normal direction). After the target position (TGT POSN) is detected, a REW search mode ensues in which the search operation is performed while rewinding the tape in a REW direction (reverse direction) at 16 times normal speed. Shortly after passing back over the target position a report is returned to the computer that the target position is detected. In this example, the computer instructs the DAT to forward the tape at normal speed.

Figure 10C:
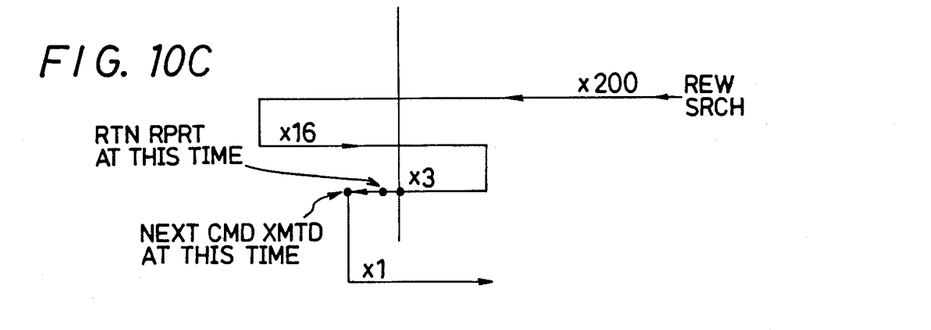
FIG. 10c is an illustration showing a reverse tape direction search method.

FIG. 10C shows the case wherein the REW search mode is executed. The count FMC=4 is detected while rewinding the tape at 200 times normal speed. The rewinding operation is performed until it detected that the tape has passed by the target position. Thereafter, a stop signal is sent to the tape drive system as well as a signal for driving the tape at a 16-times speed in the forward direction. Thus, the tape has passed by the target position and stopped, and is then reversed to travel at a 16-times normal forward speed while detecting the FMC. The 16-times speed traveling is continued until it is again determined that the tape has passed by the target position. Then the tape travel direction is reversed and the tape travels at a 3 times normal reverse speed until it is determined that the tape has passed by the target position. The host computer is informed by the DAT through the bus line that the target position is detected. After a 200-msec standby time has passed, the next command signal is awaited. When the next command signal is received, the FMC is detected while feeding the tape at a normal speed to detect the target position "4".

Figure 11A:
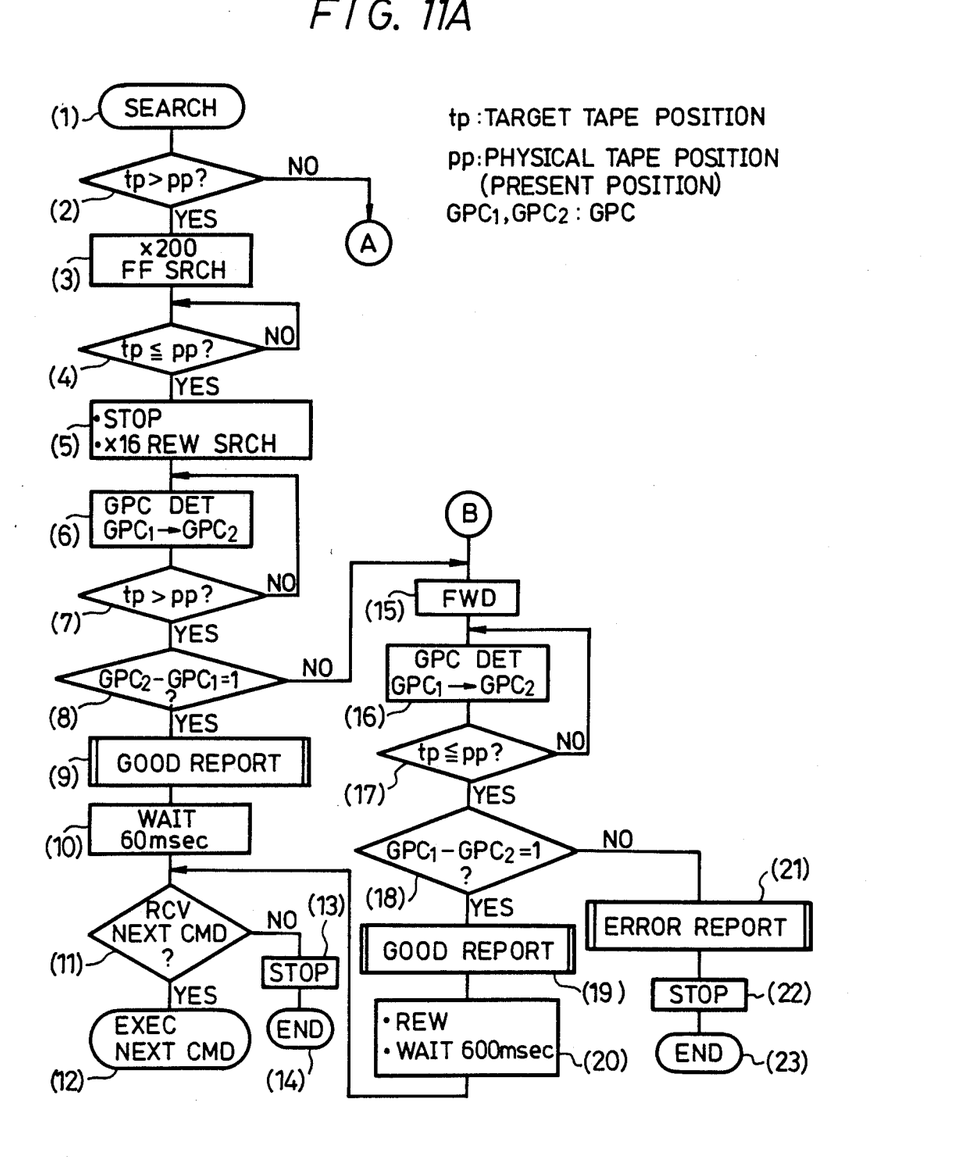
FIGS. 11A and 11B together constitute a flow chart showing a search sequence.
Figure 11B:
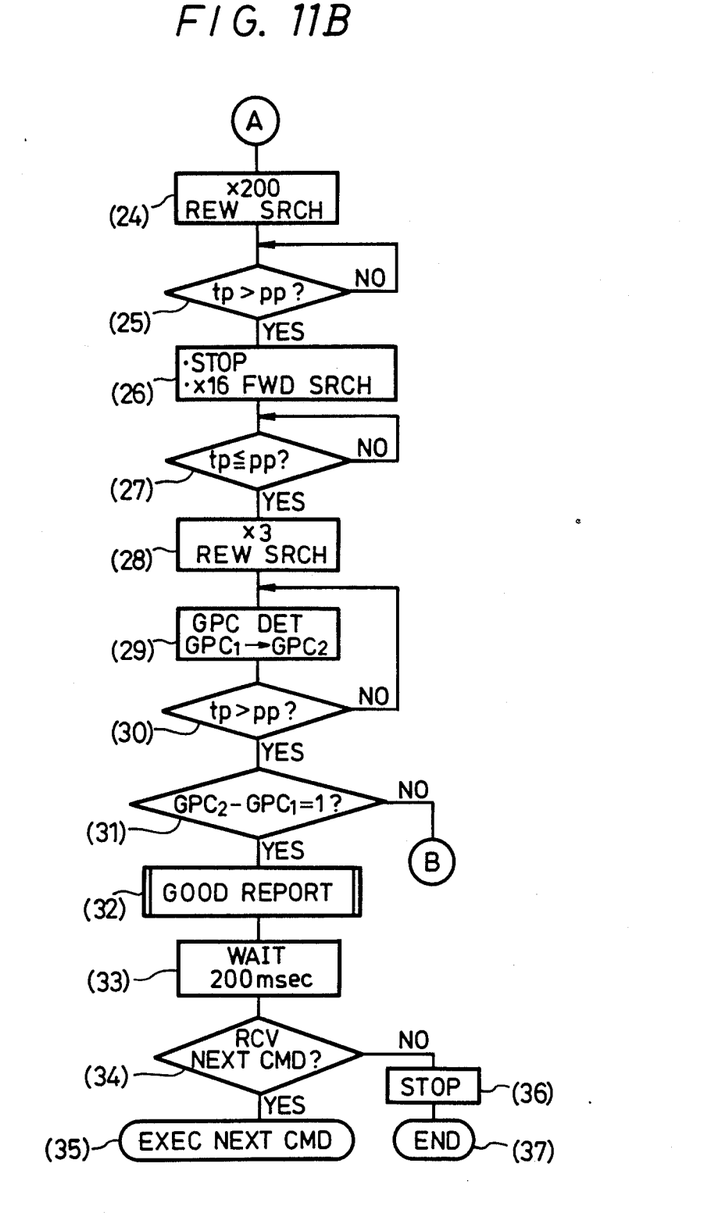

FIGS. 11A and 11B are a flow chart of the steps taken by the system controller when the FF and REW search modes are executed. Reference symbol tp indicates a target position represented by the FMC and pp represents a present position on the tape represented by the FMC. Reference symbol GPC1 denotes a present GPC and $GPC_2$ represents an immediately preceding GPC. Therefore, during traveling of the tape, the present $GPC_1$ serves as the $GPC_2$ when the next $GPC_1$ is detected.

In FIGS. 10B and 11A, after a high-speed search routine is started in step (1), it is checked whether tp >pp in step (2), i.e. whether the present position is located before or after the target position. If tp >pp then the present position is located before the target position, and the FF search mode in step (3) and subsequent steps is executed. If tp ≦ pp then the present position is located after the target position, and the REW search mode in step (24) (FIG. 11B) and subsequent steps is executed.

In the FF search mode, the count FMC is detected while fast-forwarding the tape at 200-times normal speed. The fast-forwarding operation is performed until it is detected in step 4 that tp ≦ pp, indicating that the tape has arrived at the target position or has passed by the target position. If the determination is YES in step (4), a stop signal is sent to the tape drive system in step (5) as well as a signal for driving the tape at a 16 times normal speed in the opposite direction. Thus, the tape has passed by the target position and stopped, and is then reversed, so that it travels at a 16 times normal speed while detecting the FMC. In step (6), as the tape is traveling the GPCs are detected and sequentially set to be $GPC_1$ and $GPC_2$. The 16 times normal speed travel is performed until tp>pp in step (7), i.e., until it is determined that the target position has been passed again. If the determination is YES in step (7), it is checked in step (8) if $GPC_2-GPC_1=$"1". If $GPC_2-GPC_1=1$ immediately after tp > pp is established in step (8), then $GPC_2=9$ and $GPC_1=8$ (see FIG. 10A), and it is regarded that the tape has reached the target position. In step (9), the host computer is informed by the sending of a "Good Report" signal through the bus line that the target position is detected. After a 60-msec standby time has passed in step (10), the next command signal is awaited in step (11). When the next command signal is received in step (11), an operation is performed in accordance with the command signal in step (12). In this operation, the FMC is detected while forwarding the tape at a normal speed to search the target position "4". If no command signal is input in step (11), the tape is stopped in step (13), and the routine is ended in step (14).

If $GPC_2-GPC_1 \ne 1$ is established in step (8) due to drop-out of data or the like, the flow advances to step (15) to forward the tape, and the GPC is detected in step (16). Step (16) is repeated until tp ≧ pp in step (17), i.e., until the tape has passed by the target position again. If tp ≧ pp is established, it is checked in step (18) if $GPC_1-GPC_2=1$. If the determination is YES in step (18), it is determined that the target position is detected, and the host computer is informed of this fact in step (19). In step (20), the tape direction is reversed, and after 600 msec have passed, the flow advances to step (11). If $GPC_1-GPC_2 \ne 1$ is established in step (18), the tape is stopped in step (21), and the routine is ended in step (23).

If the determination is NO in step (2), the REW search mode is executed (FIG. 11B). In step (24), the count FMC is detected while rewinding the tape at a 200 times normal speed. The rewinding operation is performed until tp > pp is established in step (25) to determine that the tape has passed by the target position. If the determination is YES in step (25), a stop signal is sent to the tape drive system in step (26) as well as a signal for driving the tape at a 16 times normal speed in the opposite direction. Thus, the tape has passed by the target position and stopped, and is then reversed to travel at a 16 times normal speed while detecting the FMC. The 16 times normal speed traveling is continued until tp < pp in step (27), that is, until it is again determined that the tape has passed by the target position. If the determination YES is obtained in step (27), the tape travel direction is reversed in step (28), and the tape travels at a 3 times normal speed. In step (29), the GPCs are detected and sequentially set to be $GPC_1$ and $GPC_2$. The 3 times normal speed traveling is continued until tp > pp is established in step (3), i.e., until it is determined that the tape has passed by the target position. If the determination is YES in step (30), it is checked in step (31) if $GPC_2-GPC_1=$"1". If $GPC_2-GPC_1=1$ in step (31) immediately after tp >pp is established in step (30), then $GPC_2=9$ and $GPC_1=8$ and it is regarded that the target position has been reached. In step (32), the host computer is informed by the sending of a "Good Report" signal through the bus line that the target position is detected. After a 200-msec standby time has passed in step (33), the next command signal is awaited in step (34). If the next command signal is received, an operation corresponding to the command signal is executed in step (35). In this operation, the FMC is detected while driving the tape at a normal speed to detect the target position "FMC=4". If no command signal is received in step (34), the tape is stopped in step (36), and the routine is ended in step (37).

If $GPC_2-GPC_1 \ne 1$ is established in step (31) due to drop-out of data or the like, the flow enters the routine after step (15), and the above-mentioned operation is executed.

As described above, immediately after it is determined that the target position is detected in step (8) in the FF search mode or in step (31) in the REW search mode, a "good report" is transmitted to the host computer in steps (9) and (32) so that the next command can be received early while the tape is being driven. Therefore, no time is wasted and the search time can be shortened. In this embodiment, the counts GPC and FMC are used as position signals of the recording medium. However, the search operation can be performed using the above-mentioned SSMC and RMC, as a matter of course.

In summary, according to the prior art data search method illustrated in FIG. 1, if a target position is set, for example, FMC=4, then during the search after the tape is driven at fast forward, fast rewind, forward, rewind, etc., and then stopped at the target position FMC=4, the search end signal is transmitted. This search method requires a long period of time until the search end and also a time period for the next operation command. In other words, there are required a time during which the tape is stopped and a rising-up time when the tape is stopped and then accelerated to its predetermined speed.

On the other hand, according to the present invention, when the target position FMC=4 is searched for, before the tape is stopped at the target position, a Good Report signal indicating that the target position is detected is supplied to the host computer. That is, in practice, in the high speed search mode, the target position FMC=4 is detected and the speed is changed to 16 times normal speed.

When the boundary of the Group including FMC=4 is detected by comparing the difference of two successive Group Counts to one (e.g. "$GPC_2-GPC_1=1$"), the Good Report signal is fed to the host computer. Thus, without stopping the tape, the next command from the host computer can be responded to. Thus, a high speed search becomes possible.

Although the present invention has been shown and described with respect to preferred embodiments, various changes and modifications which are obvious to a person skilled in the art to which the invention pertains are deemed to lie within the spirit and scope of the invention.

What is claimed is:

1. A search method for locating a target position on a recording medium on which a plurality of position signals are recorded at intervals, comprising the steps of:
   (a) driving the recording medium in first one direction while detecting the recorded position signals from a position which is fixed relative to the recording medium,
   (b) reversing the direction of recording medium travel when a predetermined recorded position signal corresponding to the target position is detected,
   (c) decreasing the travel speed of the recording medium until the predetermined recorded position signal is again detected,
   (d) repeating steps a–c, inclusive, a predetermined number of times so as to detect the target position on the recording medium, and wherein
   (e) after it is detected that the target position has been last passed, generated a good report signal, without stopping and pausing the recording medium, indicating that the target position has been searched.

2. A search method for locating a target position on a recording medium according to claim 1, wherein data is recorded in a plurality of units on the recording medium and wherein main data is recorded in a first area in every unit on the recording medium, and a count signal corresponding to the number of each data unit counted from the beginning of the recording medium and various other count signals, including group count signals are recorded in a second area in each unit.

3. A search method for locating a target position on a recording medium according to claim 2, wherein in performing the search a digital audio tape recorder is used, the first area is a pulse code modulated data area and the second area is a sub code area.

4. A search method for locating a target position on a recording medium according to claim 2, wherein among the plurality of the position signals recorded on the medium are file mark counts.

5. A search method for locating a target position on a recording medium according to claim 4, wherein the group counts on the recording medium are detected and when the difference between two successive group counts equals one after it has been detected that the target position has been passed, the good report signal is generated.

6. A search method for locating a target position on a recording medium according to claim 2, wherein among the plurality of the count signals recorded on the medium are save set mark counts.

7. A search method for locating a target position on a recording medium according to claim 2, wherein among the plurality of the count signals recorded on the medium are record mark counts.

8. A search method for locating a target position on a recording medium according to claim 7, wherein data is recorded on the recording medium in oblique tracks, a pair of such tracks constituting a frame and a predetermined number of frames constituting a group and wherein among the plurality of position signals are group counts representing the number of frame groups counted from one end of the recording medium and further wherein the group counts on the recording medium are detected and when the difference between two successive group counts equals one after it has been detected that the target position has been passed, the good report signal is generated.

9. A search method for locating a target position on a recording medium on which a plurality of position signals are recorded at intervals, comprising the steps of:
   driving the recording medium in first one direction while detecting the recorded position signals from a position which is fixed relative to the recording medium,
   reversing the direction of recording medium travel when a predetermined recorded position signal corresponding to the target position is detected,
   decreasing the travel speed of the recording medium until the predetermined recorded position signal is again detected,
   repeating steps a–c, inclusive, a predetermined number of times so as to detect the target position on the recording medium, and
   wherein in carrying out steps a–c, inclusive, a target count value and a unit count vale reproduced from the recording medium are compared with each other, the direction and the speed of the recording medium are controlled in accordance with the comparison output, when the count value reproduced from the recording medium becomes close to the target count value, a good report signal is generated after detecting a division of the unit count signal; and
   wherein in response to the generation of the good report signal, the recording medium is caused to move in the opposite direction, without first stopping and pausing, until the count value reproduced from the recording medium equals the target count value.

10. A search method for locating a target position on a recording medium on which a plurality of position signals are recorded at intervals, comprising the steps of:
    driving the recording medium in a first direction at a first speed, which is faster than a predetermined normal playback speed, while detecting the recorded position signals from a position which is fixed relative to the recording medium,
    reversing the direction of recording medium travel so as to travel in a second direction, opposite to the first direction, when a predetermined recorded position signal corresponding to the target position is detected, decreasing the travel speed of the recording medium from the previous speed and continuing to move it in the second direction until the predetermined recorded position signal is again detected,
    repeating steps a–c, inclusive, a predetermined number of times so as to detect the target position on the recording medium, and wherein
    after it is detected that the target position has been last passed, generating a good report signal indicating that the target position has been searched; and
    thereafter, in response to the good report signal, causing the recording medium to reverse direction, without first stopping and pausing, move at the predetermined normal playback speed until the target position is detected, and then stop.

* * * * *

UNITED STATES PATENT AND TRADEMARK OFFICE
CERTIFICATE OF CORRECTION

PATENT NO. : 4,958,244

DATED : September 18, 1990

INVENTOR(S): Yoshizumi Inazawa, et al.

It is certified that error appears in the above - identified patent and that said Letters Patent is hereby corrected as shown below: Title page:

[73] Assignee:   Sony Corporation, Tokyo, Japan
                           and
                Hewlett-Packard Limited
                Nine Mile Ride, Wokingham
                Berkshire RG11 3LL, England Signed and Sealed this Tenth Day of March, 1992

Attest:

HARRY F. MANBECK, JR.

*Attesting Officer*  *Commissioner of Patents and Trademarks*